United States Patent
Kunugi et al.

(10) Patent No.: US 6,400,114 B2
(45) Date of Patent: Jun. 4, 2002

(54) NUMERICAL CONTROL APPARATUS FOR ROLL GRINDING MACHINE

(75) Inventors: Takashi Kunugi, Kannami-Cho; Hiroshi Uchimura, Numazu, both of (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/808,954

(22) Filed: Mar. 16, 2001

(30) Foreign Application Priority Data

Mar. 16, 2000 (JP) ........................................ 2000-074088

(51) Int. Cl.[7] ............................................. G05B 19/10
(52) U.S. Cl. ....................... 318/567; 318/560; 318/561; 318/563; 318/564; 318/567; 318/568.1; 318/568.22; 318/572; 318/600; 318/628; 318/632; 364/474.01; 364/474.06; 364/474.12; 364/474.15
(58) Field of Search ................................ 318/560, 561, 318/568.1, 568.24, 564, 572, 600, 628, 632, 567, 563; 364/474.01, 474.06, 472.12, 474.15

(56) References Cited

U.S. PATENT DOCUMENTS

| | | | | |
|---|---|---|---|---|
| 4,474,064 A | * | 10/1984 | Naruse et al. ................. 73/622 |
| 4,603,392 A | * | 7/1986 | Chikamoto et al. ......... 364/475 |
| 4,755,753 A | * | 7/1988 | Chern ......................... 324/237 |
| 4,815,000 A | * | 3/1989 | Yoneda et al. ......... 364/474.34 |
| 4,902,951 A | * | 2/1990 | Ohta et al. ................... 318/632 |
| 4,956,946 A | * | 9/1990 | Tsujiuchi et al. ......... 51/165.71 |
| 4,967,515 A | * | 11/1990 | Tsujiuchi et al. ......... 51/165.75 |
| 5,105,137 A | * | 4/1992 | Iijima ..................... 318/568.22 |
| 5,477,118 A | * | 12/1995 | Yoneda et al. ............... 318/569 |

FOREIGN PATENT DOCUMENTS

| | | | | |
|---|---|---|---|---|
| JP | 03-035158 | * | 2/1991 | .......... G01N/27/90 |
| JP | 07-223003 | * | 8/1995 | .......... B21B/28/00 |
| JP | 07-280778 | * | 10/1995 | .......... B21B/28/00 |
| JP | 09-080030 | * | 3/1997 | .......... B21B/27/00 |

* cited by examiner

Primary Examiner—Jeffrey Donels
Assistant Examiner—Tyrone W Smith
(74) Attorney, Agent, or Firm—Pillsbury Winthrop LLP

(57) ABSTRACT

A numerical control apparatus for the numerical control of a roll grinding machine comprises a flaw detecting means for scanning the entire surface of a roll (11), provided with an ultrasonic detecting head (23) for detecting flaws formed in the surface of the roll (11), a command generating means for generating cross-feed commands to repair detected flaws on the basis of flaw information about the positions and levels of the detected flaws, a control means for executing a first shaft position control operation on the basis of the cross-feed command to position the grinding wheel at a position with respect to a Z-axis corresponding to the position of the flaw by moving the wheel spindle stock in parallel to the axis of the roll and a second shaft positioning control operation to cross-feed the grinding wheel in parallel to an X-axis, and a decision means for deciding whether or not the flaw has been completely repaired and invoking the next cross-feed command if the flaw has been completely repaired.

5 Claims, 2 Drawing Sheets

NUMERICAL CONTROL APPARATUS FOR ROLL GRINDING MACHINE

BACKGROUND OF THE INVENTION

1. Field of the Invention

The present invention relates to a numerical control apparatus for controlling a roll grinding machine and, more particularly, to a numerical control apparatus for controlling a roll grinding machine, capable of detecting flaws in the circumferential surface of a roll being ground and of continuing automatic grinding until all the flaws are removed from the circumferential surface of the roll.

2. Description of the Related Art

A roll grinding machine is provided with a flaw detecting means for finding flaws in a surface of a roll being ground thereon. Flaw detecting techniques include ultrasonic test methods and eddy current test methods. Known ultrasonic test methods are disclosed in, for example, JP-A No. 1994-142215 and JP-A No. 1994-281213. A known eddy current test method is disclosed in, for example, JP-A No. 1992 3-35158.

Although the relative depths and sizes of flaws formed in the circumferential surface of a roll can be determined by a conventional flaw detector, the absolute depth of each flaw cannot be determined by the conventional flaw detector.

When grinding a roll by a conventional roll grinding machine, a cycle consisting of grinding process, testing process and grinding process is repeated, in which the circumferential surface of the roll is inspected by a flaw detector, the operator visually recognizes flaws and the roll is ground in a manual grinding mode, until all the flaws disappear. Therefore, an automatic grinding process controlled by a numerical controller is not suitable for grinding a roll having flaws in its circumference and the operator must watch a grinding machine throughout a grinding process from beginning to end and hence such a roll cannot efficiently be ground.

SUMMARY OF THE INVENTION

Accordingly, it is an object of the present invention to solve problems in the prior art and to provided a numerical control apparatus for a roll grinding machine capable of automatically carrying out a series of steps including those of detecting flaws in a roll and grinding the roll, and of automatically and efficiently performing a grinding operation until all the flaws in the roll are removed.

With this object in view, the present invention provides a numerical control apparatus for the numerical control of a roll grinding machine that supports a roll to be ground between a headstock and a tailstock, rotates the roll, cross-feeds a wheel spindle stock supporting a grinding wheel in a radial direction and longitudinally feeds the wheel spindle stock supporting the grinding wheel in parallel to the axis of the roll to carry out a programmed series of grinding steps, comprising: a flaw detecting means for scanning an entire surface of the roll, provided with a flaw detecting head for detecting flaws formed in the surface of the roll; a flaw information generating means for generating flaw information specifying positions of the detected flaws; a command generating means for generating cross-feed commands to repair detected flaws on the basis of flaw information; a control means for executing a first axis position control on the basis of the cross-feed command to position the grinding wheel at a position corresponding to the position of the flaw by longitudinally moving the wheel spindle stock in parallel to the axis of the roll and a second axis positioning control to cross-feed the grinding wheel radially; a decision means for deciding whether or not the flaw has been completely repaired and providing the stop signal for cross-feed motion to the control means; and a skipping means for skipping to the next cross-feed command if the flaw has been completely repaired.

Preferably, the decision means includes a next command invoking means that compares an output signal of a flaw detector and a predetermined flaw level threshold, and decides that the flaw has been completely repaired when the output signal of the flaw detector provided while the roll turns one full turn is smaller than the flaw level threshold.

BRIEF DESCRIPTION OF THE DRAWINGS

The above and other objects, features and advantages of the present invention will become more apparent form the following description taken in connection with the accompanying drawings, in which.

DESCRIPTION OF THE PREFERRED EMBODIMENTS

Figure 1:
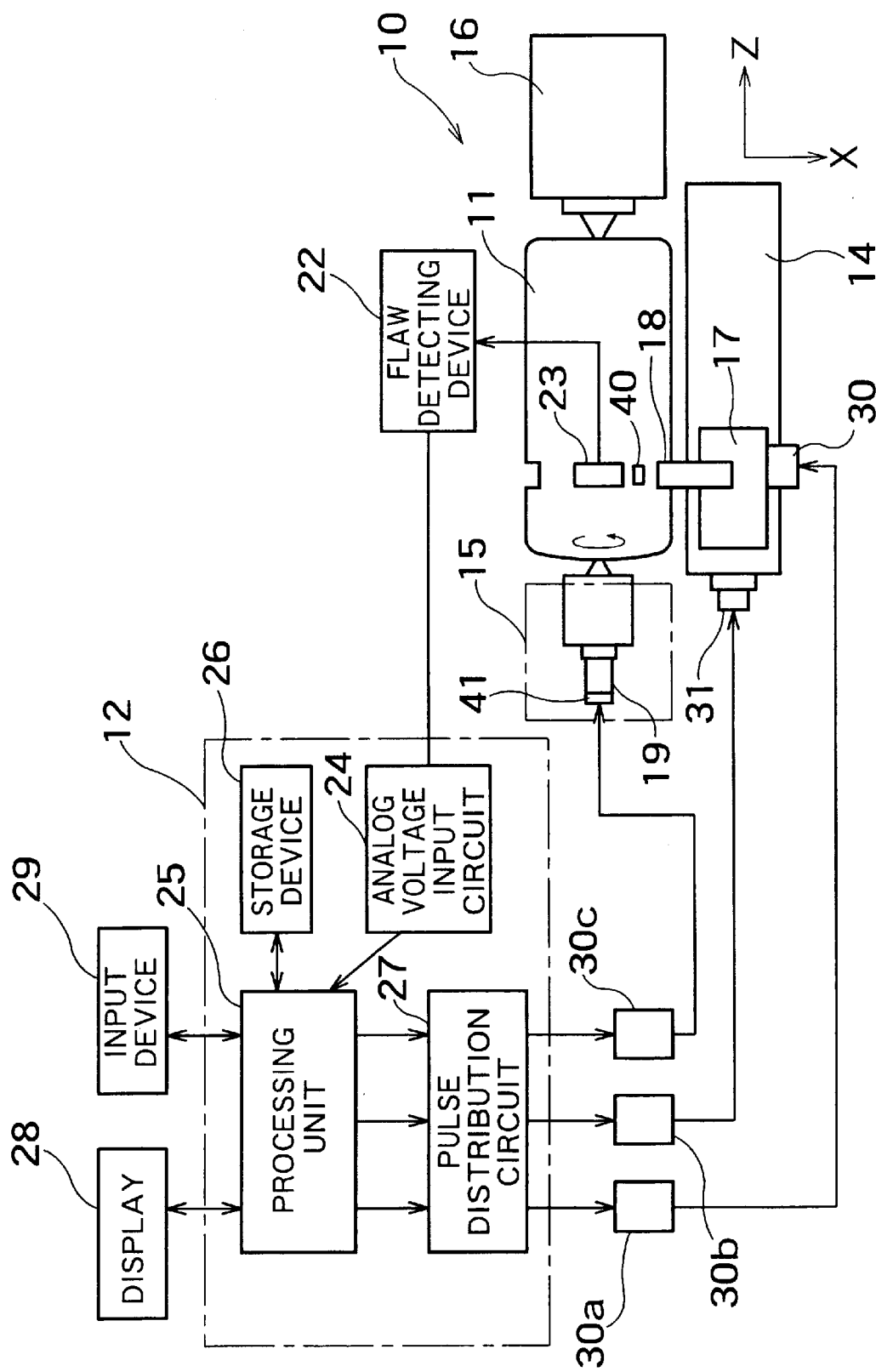
FIG. 1 is a block diagram of numerical controller in a preferred embodiment according to the present invention for controlling a roll grinding machine.

FIG. 1 shows a numerical controller 12 in a preferred embodiment according to the present invention for controlling a roll grinding machine 10 that grinds a roll 11, i.e., a workpiece.

The roll grinding machine 10 includes a carriage 14, a spindle stock 15 and a tailstock 16. The carriage 14 is able to move in a direction parallel to a Z-axis parallel to the axis of the roll 11 supported for rotation between the spindle stock 15 and the tailstock 16. A wheel spindle stock 17 is disposed on the carriage 14 movably in a direction parallel to a X-axis perpendicular to the Z-axis. The wheel spindle stock 17 supports a grinding wheel 18 with the axis of the grinding wheel 18 extended in parallel to the axis of the roll 11. An in-feed mechanism, not shown, cross-feeds the wheel spindle stock 17 thus supporting the grinding wheel 18 to grind the roll 11. The headstock 15 and the tailstock 16 enter the roll 11 into alignment with the axial direction. The headstock 15 transmits the driving torque of a spindle motor 19 to the roll 11 to rotate the roll 11.

The roll grinding machine 10 is provided with a flaw detecting device 22 having an ultrasonic detecting head 23. The ultrasonic detecting head 23 is mounted on the carriage 14. The ultrasonic detecting head 23 emits ultrasonic waves toward the circumferential surface of the roll 11, receives the ultrasonic waves reflected from the surface of the roll 11. The ultrasonic detecting head scans the entire surface of the roll 11 for flaws and, any flaw is found in the surface of the roll 11, determines the level of the flaw. The level is one of grades respectively evaluating and specifying sizes of flaws. The flaw detecting device 22 gives a voltage signal corresponding to a detection signal received from the ultrasonic detecting head 23 to the numerical controller 12.

The numerical controller includes an analog voltage signal receiving circuit 24, a processing unit 25, a storage device 26 storing data necessary for the numerical control of the roll grinding machine 10 and accessible to the stored data whenever necessary and a pulse distributing circuit 27 for distributing command pulses to servo units associated with control axes. The voltage signal provided by the flaw detecting device 22 is transferred through the analog voltage signal receiving circuit 24 to the processing unit 25. An input device 28 and a display 29 are connected to the processing unit 25. An NC command program is entered into the processing unit 25 by operating the input device 28. The processing unit 25 analyzes the NC command program and calculates commands including a depth of cut along the X-axis, a distance of longitudinal movement along the Z-axis, a rotating speed for the spindle motor 19 and the like. The pulse distributing circuit 27 distributes those commands to a first servo controller 30a, a second servo controller 30b and a third servo controller 30c for controlling an X-axis motor 30, a Z-axis motor 31 and the spindle motor 19, respectively. Shown also in FIG. 1 is an angular position measuring device 41, such as a rotary encoder, for measuring the angular position of the spindle of the roll grinding machine 10 (the roll 11 on the roll grinding machine 10).

Figure 2:
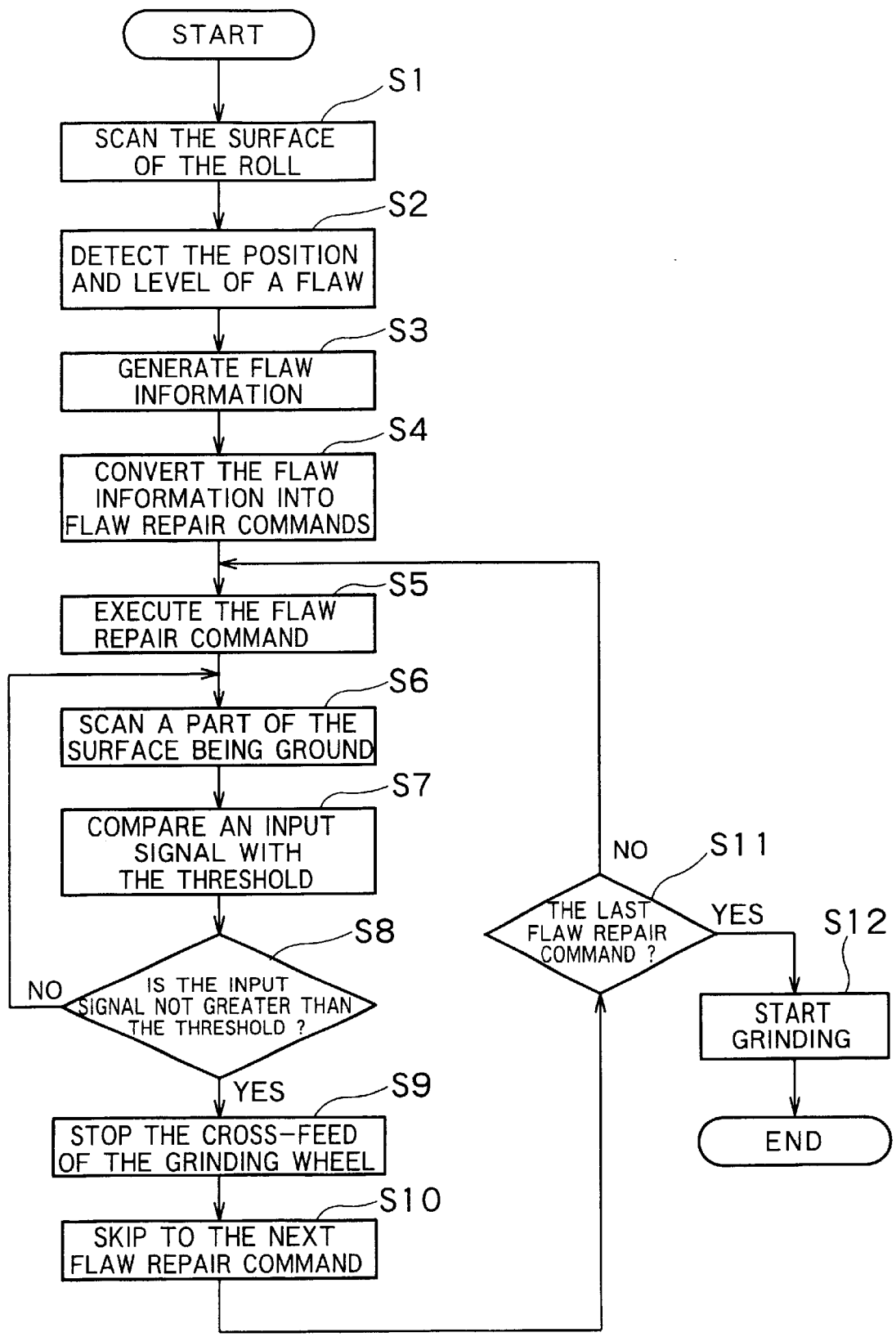
FIG. 2 is a flow chart of a control program to be executed by the numerical controller shown in FIG. 1.

The operation of the numerical controller 12 will be described with reference to a flow chart shown in FIG. 2 showing a numerical control program to be executed by the numerical controller 12. The flaw detecting device 22 scans the surface of the roll 11 for flaws in step S1. When a flaw detection command is given, the third servo controller 30c controls the spindle motor 19 to enable the ultrasonic detecting head 23 to scan the surface of the roll 11 in a circumferential direction, the second servo controller 30b gives a Z-axis moving command to move the ultrasonic detecting head 23 in parallel to the Z-axis. Thus, the ultrasonic detecting head 23 scans the entire surface of the roll 11. When a flaw is found in the surface of the roll 11, the processing unit 25 specifies the position and the level of the flaw in step S2. The processing unit 25 produces flaw information including data on the respective positions and levels of flaws in step S3 and produces flaw repair commands respectively for repairing the flaws in step S4. Each flaw repair command specifies a position of the grinding wheel 18 on the Z-axis corresponding to the flaw and a depth of cut along the X-axis. The flaw information is stored in the storage device 26.

Subsequently, the flaw repair command for repairing a first flaw 40 is executed in step S5. A command specifying a position of the grinding wheel 18 on the Z-axis corresponding to the flaw 40 is given to the second servo controller 30b. The carriage 14 is moved to locate the grinding wheel 18 right opposite the flaw 40.

Then, the processing unit 25 gives a command specifying a depth of cut along the X-axis to the first servo controller 30a. Then, the wheel spindle stock 17 is advanced in parallel to the X-axis and the grinding wheel 18 cuts gradually into the roll 11 and, consequently, the flaw 40 diminishes gradually. Meanwhile, the ultrasonic detecting head 23 performs a scanning operation at a position corresponding to the position of the flaw 40 with respect to the Z-axis in step S6. The ultrasonic detecting head 23 generates an output signal continuously while the roll 11 is turned one full turn. The output signal of the ultrasonic detecting head 23 is given to the analog voltage input circuit 24 and the analog voltage input circuit 24 gives a voltage signal corresponding to the output signal of the ultrasonic detecting head 23 to the processing unit 25. The processing unit 25 monitors the magnitude of the input voltage signal and compares the magnitude of the input voltage signal with a predetermined threshold in step S7. If the magnitude of the input voltage signal is greater than the threshold, i.e., if the response to a query in step S8 is negative, the cross-feed of the grinding wheel 18 is continued. If the magnitude of the input voltage signal is not greater than the threshold, i.e., if the response to a query in step S8 is affirmative, it is decided that the flaw 40 has been completely repaired.

Then, processing unit 25 gives a cross-feed stop command to the first servo controller 30a in step S9 to stop the cross-feed of the grinding wheel 18. If the flaw is not last detected flaw in step 11, then, the processing unit 25 returns from step S10 to step S5 to execute the next repair command and repeats steps S5 to S10. All the flaws have been repaired, the program goes to step S12 in which the carriage 14 is reciprocated in directions parallel to the Z-axis to grind the roll 11 entirely by an ordinary grinding operation. Thus, a flaw detecting process, a flaw repairing process for repairing all the detected flaws, and a roll grinding process for grinding the roll 11 in a desired size can be automatically and efficiently carried out.

As apparent from the foregoing description, according to the present invention, the series of processes for detecting flaws, repairing detected flaws and grinding the roll can be automatically and efficiently accomplished.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A numerical control apparatus for the numerical control of a roll grinding machine that supports a roll to be ground between a headstock and a tailstock, rotates the roll, cross-feeds a wheel spindle stock supporting a grinding wheel in a radial direction and longitudinally feeds the wheel spindle stock supporting the grinding wheel in parallel to an axis of the roll to control a programmed series of grinding steps, said numerical control apparatus comprising:

a flaw detecting means for scanning an entire surface of the roll, provided with a flaw detecting head for detecting flaws formed in the surface of the roll;

a flaw information generating means for generating flaw information specifying positions of the detected flaws a command generating means for generating cross-feed commands to repair detected flaws on the basis of flaw information;

a control means for executing a first axis position control on the basis of the cross-feed command to position the grinding wheel at a position corresponding to the position of the flaw by longitudinally moving the wheel spindle stock in parallel to the axis of the roll and a second axis positioning control to cross-feed the grinding wheel radially; and a decision means for deciding whether or not the flaw has been completely repaired and providing the stop signal for cross-feed motion to the control means;

a skipping means for skipping to the next cross-feed command if the flaw has been completely repaired.

2. The numerical control apparatus according to claim 1, wherein the decision means includes a next command invoking means that compares an output signal of a flaw detector and a predetermined flaw level threshold, and decides that the flaw has been completely repaired when the output signal of the flaw detector provided while the roll turns one full turn is smaller than the flaw level threshold.

3. The numerical control apparatus according to claim 1, wherein the skipping means decides whether or the repaired flaw is the last detected flaw, and if the flaw is not last detected flaw, skips to the next cross-feed command.

4. The numerical control apparatus according to claim 1, wherein the flaw information generating means generates flaw information including data for evaluating a level of the flaw to specify sizes of the flaw.

5. The numerical control apparatus according to any one of the preceding claims, wherein the flaw detecting head comprises an ultrasonic detecting head.

* * * * *